4 Sheets—Sheet 1.

G. H. HOWE.
Grain-Binders.

No. 204,329. Patented May 28, 1878.

WITNESSES
Sam'l R. Turner
P. B. Turpin

INVENTOR
George H. Howe
By R. S. & A. P. Lacey
ATTORNEYS

4 Sheets—Sheet 2.

G. H. HOWE.
Grain-Binders.

No. 204,329. Patented May 28, 1878.

WITNESSES
Saml. R. Turner
R. B. Turpin

INVENTOR
George H. Howe
By R. S. & A. T. Lacey
ATTORNEYS

4 Sheets—Sheet 3.

G. H. HOWE.
Grain-Binders.

No. 204,329. Patented May 28, 1878.

WITNESSES
Saml. R. Turner
R. H. Lacey

INVENTOR
George H. Howe
By R. S. & A. T. Lacey
ATTORNEYS

4 Sheets—Sheet 4.

G. H. HOWE.
Grain-Binders.

No. 204,329. Patented May 28, 1878.

WITNESSES
Saml R Turner
R. H. Lacey.

INVENTOR
George H. Howe
By R. S. & A. Lacey
ATTORNEY

UNITED STATES PATENT OFFICE.

GEORGE H. HOWE, OF AKRON, OHIO, ASSIGNOR OF ONE-HALF HIS RIGHT TO WILLIAM M. HOWE, OF AUSTIN, MINNESOTA.

IMPROVEMENT IN GRAIN-BINDERS.

Specification forming part of Letters Patent No. 204,329, dated May 28, 1878; application filed August 7, 1877.

*To all whom it may concern:*

Be it known that I, GEORGE H. HOWE, of Akron, in the county of Summit and State of Ohio, have invented certain new and useful Improvements in Grain-Binders; and I do hereby declare that the following is a full, clear, and exact description of my invention, which will enable others skilled in the art to which it pertains to make and use the same, reference being had to the accompanying drawings, and to the letters of reference marked thereon, which form a part of this specification.

My invention relates to improvements in that class of grain-binding machines in which straw is employed for bands; and it consists in the construction, combination, and operation of the several parts hereinafter fully described.

Figure 1:
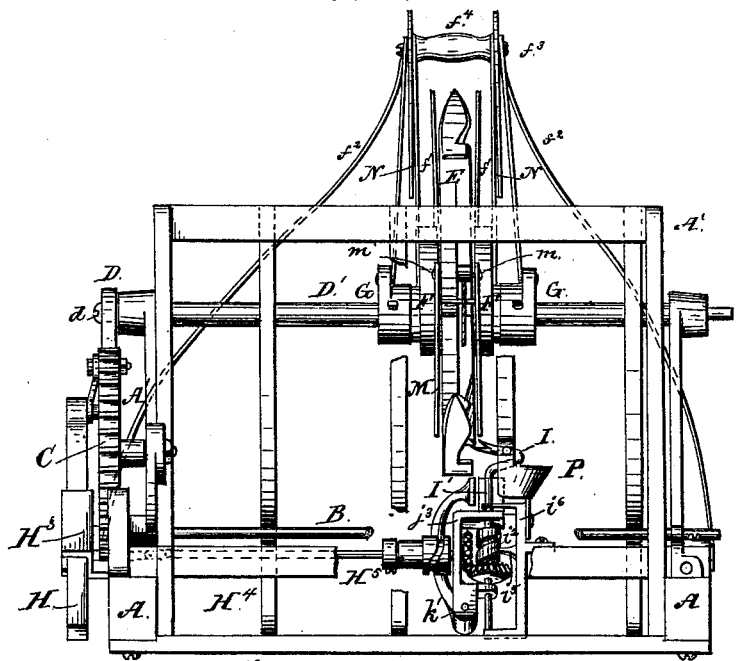
Figure 2:
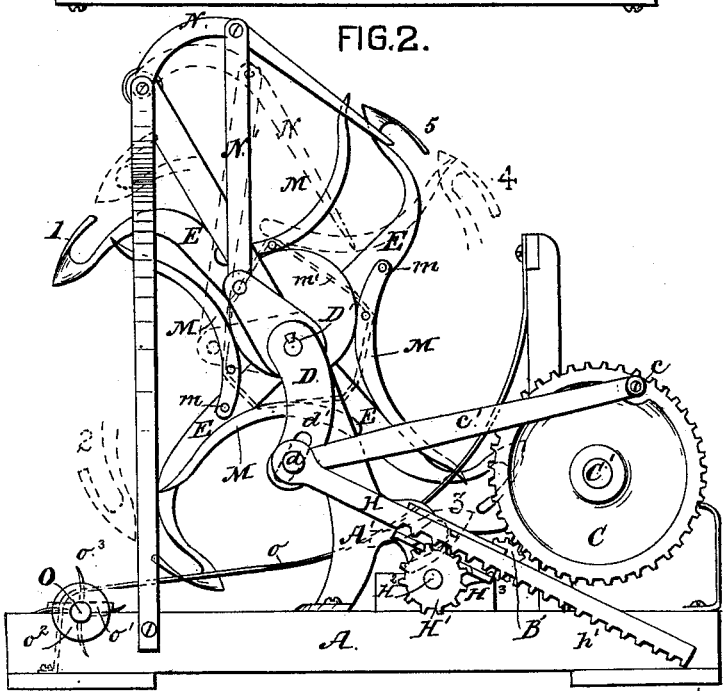
Figure 3:
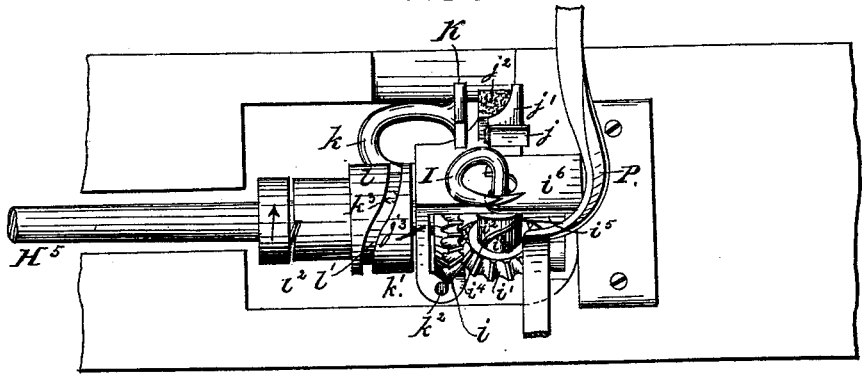
Figure 4:
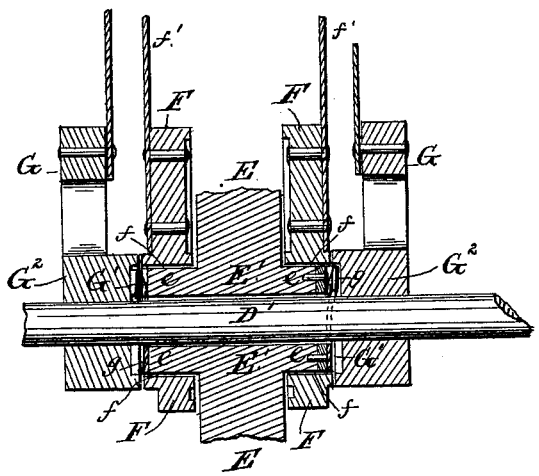
Figure 5:
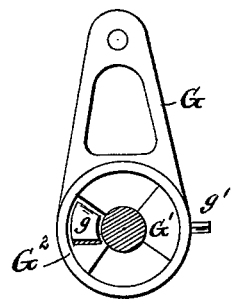
Figure 6:
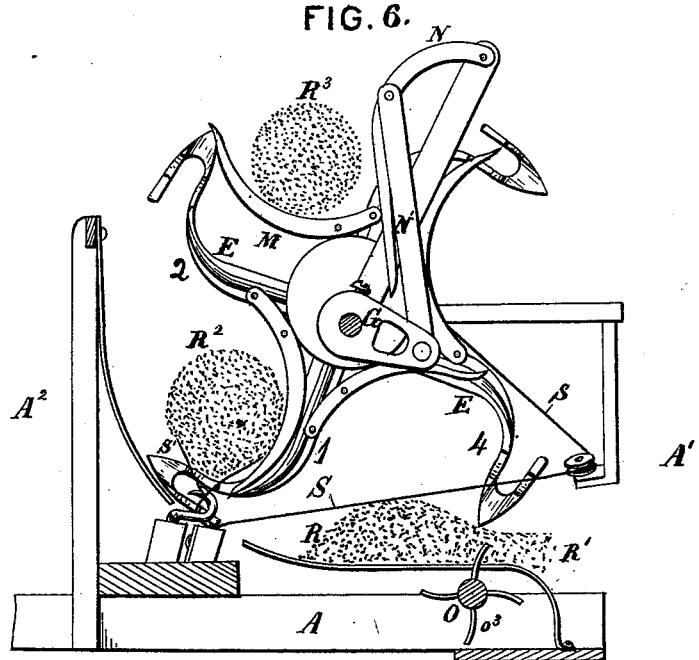
Figure 7:
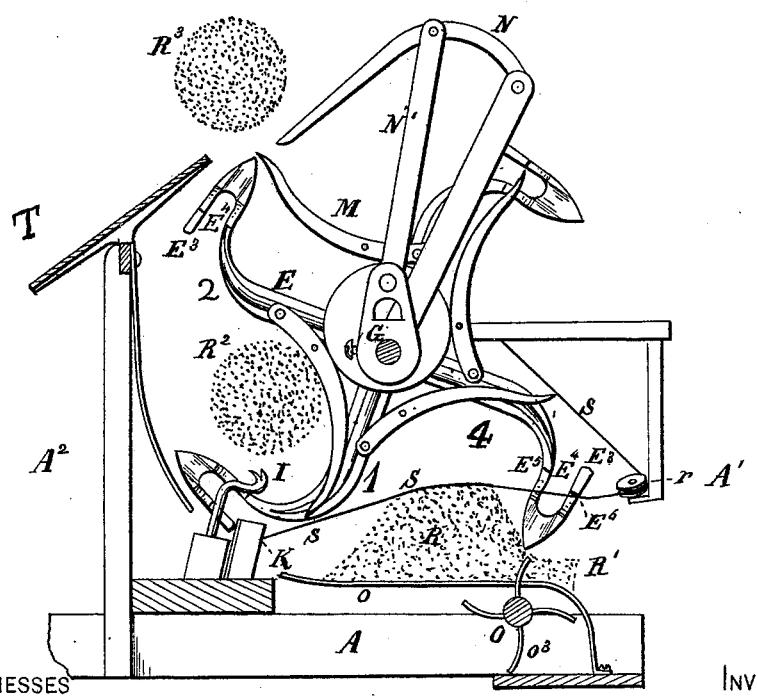
Figure 8:
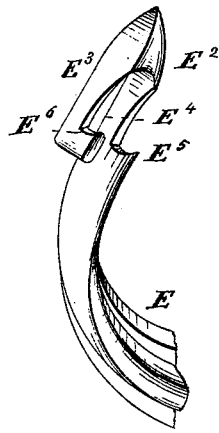
Figure 9:
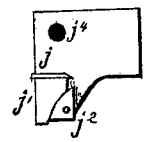
Figure 10:
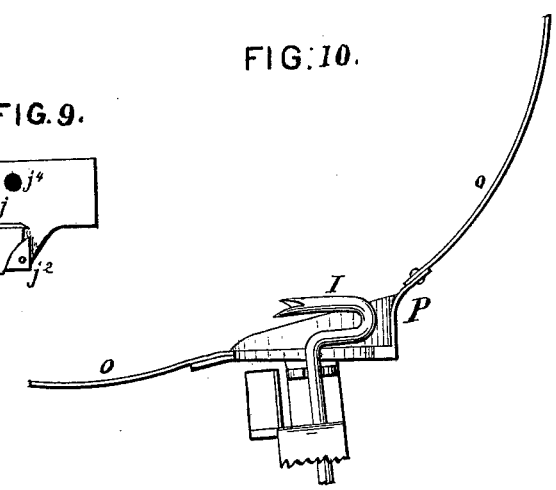
Figure 11:
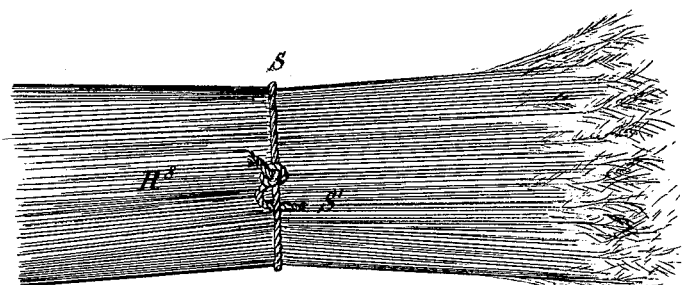
Figure 12:
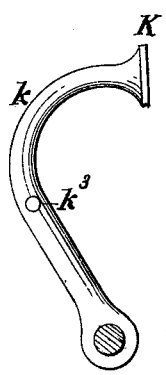
Figure 13:
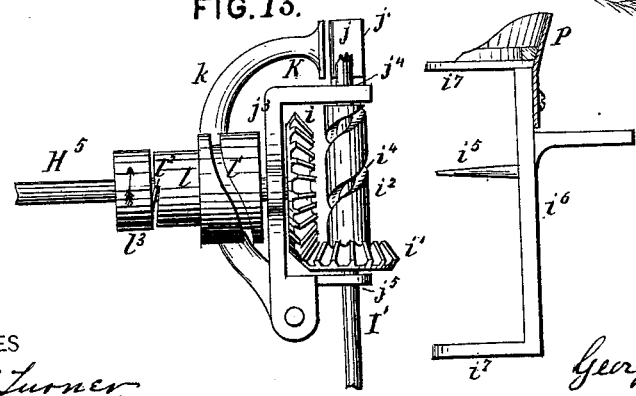

In the drawings, Figure 1 is a side elevation with parts removed. Fig. 2 is a rear end elevation. Fig. 3 is a view showing the tucking and cutting mechanism on an enlarged scale. Figs. 4 and 5 are detail views. Figs. 6 and 7 exhibit the movement of the revolving binding-arms; and Figs. 8, 9, 10, 11, 12, and 13 are detail views of parts and of the mode of tying the band.

A is the frame, to which are attached the various parts of my invention. It is secured on the side next and between the driving-wheel and the grain-platform of the reaper, with its rear side $A^1$, from which the bound gavels are discharged, placed away from, and its front or receiving side $A^2$ placed next, the said platform.

B is the driving-shaft, journaled to the rear side of the frame A, and on it is placed the necessary gear-wheel or driving-pulley, through which motion is received from the harvester and communicated to the binder. On the end of the shaft B is affixed the pinion $B'$, which meshes with the crank-gear wheel C. To the crank-wheel C is journaled one end of the pitman $c'$, the opposite end of which is journaled on a pin, $d$, affixed to or sliding in a slot in the crank D on shaft $D'$. By the peculiar arrangement of the crank-wheel C, pitman $c'$, and crank D, a partial forward and reverse revolving movement is imparted to the shaft $D'$.

E are a series of arms mounted on a hub, $E^1$, revolving on the shaft $D'$. The hub $E^1$ is provided with lateral extensions $e$, which, on their outer ends or faces, are provided with clutches $g$, which engage with corresponding clutches $G^1$ on the inner faces of the hubs $G^2$ of the crank-arms G, which are affixed rigidly to the shaft $D'$. The arms E are held steadily in position on the shaft $D'$ by the crank-arms G, snugly fitting against the ends of the hub $E^1$. Each arm E is curved near its outer end in the manner shown, so as to provide an elbow, by which the gavel is gathered into form, held while being bound, and then carried upward to the discharge-platform of the binder, as shown in Figs. 6 and 7.

$E^2$ is the head formed on the outer end of the arm E. It is made pointed, so that it will readily divide and pass through the grain or straw on the binder-platform, and separate that portion which has been compacted into a loose bundle for the gavel from that which is being received from the reaper-platform. It is constructed with an under wing, $E^3$, which extends backward from the point so as to provide an intermediate space or slot, $E^4$, on opposite sides of which are formed the shoulders $E^5$ $E^6$.

The arms E are arranged relatively to each other on their central hub $E^1$, that the shoulders $E^5$ $E^6$ on any given arm, when the latter is brought opposite the tying mechanism, will hold the band across the slot $E^4$ in proper position to be acted on by the tucker, while the outer end of that portion of the inflowing band to be employed for binding the next bundle will be caught by the shoulder on the wing of the next following arm, and held taut and in position, so that the straw may be compacted under it on the grain-platform $o$, and then carried around under the new bundle to the tying mechanism, and be brought across the slot $E^4$ and against the shoulder $E^5$, as shown in Fig. 6.

The band, instead of being held taut by the next following arm, as above described, may be so held by the guide-pulley or other device, around which it is carried into position over the platform, where it can be caught by the shoulders E⁵ E⁶. In this case, after the bundle shall have been compacted on the platform, as hereinafter described, the shoulders E⁵ E⁶, in the descent or revolution of the head of next following arm, will catch the outer end of the band and carry it around the bundle to the tying mechanism, as above described.

The series of arms E are so arranged relatively to each other on the hub E¹ that while the arm 1, Figs. 6 and 7, is holding the gavel and band in proper position for the action of the tucker, the arm 4 will have hold of the outer end of the next band, and the arm 2 will have elevated the previously-bound bundle to the place of discharge, as shown. In the revolution of the series of arms the arm 4 passes down through the grain and into a slot in the platform o, as shown by arm 2, Fig. 2, thus keeping the head E² entirely clear of the straw in the process of forming the gavel. As soon as the head E² has passed through the slot in the platform the latter, acting in conjunction with the arm, forces the grain into a compact round bundle or gavel in the elbow above described.

In the operation above described no strain is placed on the band; but the latter is held with sufficient tension, and is brought taut around the gavel, as shown, and makes a tight binding.

The crank D, with its shaft D′, does not make a complete revolution with each complete revolution of the crank-wheel C, but revolves slightly more than one-fourth of a revolution, and back the same, in order to secure perfect action of the clutches g G¹. The clutches G¹ g, in their forward revolving movement, engage and carry the arms E forward a fourth-revolution, so as to bring any given arm, as No. 2, Fig. 2, into the place or position occupied by No. 3, and then are turned back by the cranks G, so as to again engage and be in position ready for the next required quarter-revolution of said arms.

F are eccentrics for raising the lifting-arms, hereinafter described. I, by preference, employ two, though one eccentric would give the desired result. They are fixed in position close to the arms E, and have formed in them a suitable opening, f, in which the extensions e of the hub E¹ revolve. They are held in their positions by the standards f¹, braces f², secured to the frame A, pin shaft or bolt f³, and crank-arms G, arranged as shown.

H is a toothed rack, the front end of which is journaled on the pin d on the crank D, while its opposite end slides freely in a rocking bearing, H³, affixed to and turning on the axis H² of the pinion H¹, which has its shaft H⁴ journaled to the frame A. It meshes with and gives a direct and reverse revolution to the pinion H¹ and shafts H⁴ H⁵.

The shaft H⁴ of the pinion H¹ is connected, by a universal or other suitable joint, to the end of the oscillating shaft H⁵, which has mounted on its free or oscillating end the mechanism for clamping, cutting, and tucking the band.

On the end of the shaft H⁵ is fixed the bevel-pinion i, which imparts motion to the pinion on the tucker-shaft hereinafter described.

j³ is a supporting-bracket, constructed with a suitable bearing, and is placed on the shaft H⁵, just back of the pinion i. It is provided with bearings j⁴ j⁵, in which the tucker-shaft is supported, and it has formed on its upper arm a lip or projection, j¹, which is constructed and adapted to receive and hold in proper position the pad j² and knife j, with capability of adjustment or removal, as desired.

l is a sleeve mounted on the shaft H⁵. It bears loosely against the bracket, and is held in position by a fixed collar, l³. It is revolved by a clutch, l², in the direction of the arrow on the collar, Fig. 13, by the direct revolution of the shaft H⁵, while in the reverse revolution of the latter it remains stationary. It is provided with a cam-course, l¹, which engages a pin or stud, k³, on the arm k of the clamp K. The clamp K, by the devices above described, is brought against the knife j and pad j², and severs and holds the band, as hereinafter described.

The clamp K is removed from its position against by the same mechanism which presses it to the knife and pad.

On the shaft I′ of the tucker I, and between the bearings j⁴ j⁵ of the bracket j³, are fixed the bevel-pinion i¹ and sleeve or enlargement i². The pinion i¹ meshes with the pinion i on shaft H⁵, and gives motion to the tucker I. The sleeve or enlargement i² has formed around it the cam-course i⁴, as shown.

i⁶ is another bracket-piece secured to the frame A, and made, by preference, in the form shown, with the projecting arms i⁷ i⁷, in which are guide-bearings, in which the upper and lower ends of the tucker-shaft slide up and down. Projecting from this bracket is a pin, i⁵, arranged and adapted to engage in the cam-course i⁴, and, in the operation of the machine, elevate and lower the end of the shaft H⁵ with its attached mechanism, so as to bring the tucker I, clamp K, pad j², and knife j into proper positions, for purposes hereinafter explained.

The tucker I is made in the curved form shown, and its end is forked, having a longer and a shorter prong, as shown.

M are a series of lifting-arms, arranged, by preference, in pairs, as shown, and pivoted to the inner ends of the arms E, and arranged so that they will bear on the periphery of the eccentrics F. They are held down at the sides of the arms E, as indicated on arm No. 2, Fig. 2, by any suitable spring device, and they are elevated from and return to this position by the action of the eccentrics and spring, as indicated in arms Nos. 3, 4, and 1. These arms, instead of being actuated as hereinbefore described, may be readily controlled and operated by a stud or pin moving in a groove formed in the side of the eccentric F. These arms are adapted to lift the gavel, after it is bound, from its position in the curved arm E into a position where it may be discharged from the machine, as hereinafter more fully explained.

The arms M are held together by suitable rods, so as to secure simultaneous action, and may be actuated by a single eccentric, F, though I have, by preference, employed two of the latter.

N is a pair of discharging-arms, pivoted on the axis or bolt $f^3$, and are actuated by the bars N', pivoted thereto and to the crank-arms G, as shown.

O is a toothed feed-roller, which receives the grain from the platform of the reaper, (which is usually a few inches below the platform of the binder,) and elevates and forces it up onto the platform $o$ past the head of the arm E, and compacts it below the band and into the form of a loose gavel. It is provided with the fingers $o^3$, and is suitably journaled to the frame A below the platform $o$, in which is constructed suitable openings or slots to permit the free revolution of its fingers.

P is a semicircular band-holder and guide, which is so formed and placed that the tucker during a part of its work revolves within it. When the clamp K releases its hold, the end of the band projecting through the fork is caught and doubled back along the tucker I, where it is held by the guide P until the forked end of the tucker is about to enter between the band and gavel. By this arrangement a firm hold on the band is preserved and all slipping prevented. The guide is constructed of such width as to adapt it to the vertical movement of the tucking mechanism.

The band S is made of straw, twisted into form by a twisting mechanism attached to the side of machine, and is carried around a guide-pulley, $r$, arranged in front of the binder and in line with the arms E, and thence forward to the tying mechanism, as shown in Figs. 6 and 7. The tension of the band is regulated by a tension-pulley, around which it passes before it reaches the guide-pulley $r$.

In commencing work, the band is carried and arranged as shown, with its end held by the clamp K, Fig. 7.

The grain, in the operation of the machine, is delivered from the platform of the reaper to the platform $o$ of the binder. It is received by the feed-roller O, and is elevated and forced up onto the platform $o$ past the end and in front of the arm E, and compacted in a loose bundle, R, under the band S, as indicated in Fig. 7. At the proper moment the arms E revolve. The head $E^2$ on arm 4, Fig. 7, descending, catches the band S on the shoulders $E^6$ $E^5$, and, carrying the band with it, divides the loose bundle R from the inflowing grain R', carries the band around the bundle and to the tucker I. The bundle is now supported in the curve or elbow of the arm E, immediately over the tucking mechanism, with the ends of the band crossed, the end held by the clamp K and pad $j^2$ being outside and crossing the other end, opposite the slot $E^4$, between the shoulders $E^5$ $E^6$. The tucker now revolves. The forked end catches the end S' of the band, Fig. 6, passes into the slot $E^4$, and carries the end S' around the other end and out of the slot and up over the top of the head $E^2$, and tucks said end S' firmly under the band on the gavel, as shown. When the forked end of the tucker has got firmly hold of the band, the jaw K is drawn back or opened by the cam-course $l'$, thus releasing the end S'. During, and in order to effect, the operation of the tucking above indicated, the shaft $H^5$ with all its attached mechanism must be elevated, which is done by the pin $i^5$ in cam-groove $i^4$ on the tucker-shaft. At the moment the tucker I clears the slot $E^4$ in the head $E^2$, the pad $j^2$ and knife $j$ will, with the other mechanism, be raised so as to bring the side or face of the pad and the edge of the knife alongside of the indrawing end of the band, and then the jaw K, raised with the other mechanism and thrown up by the cam-course $l$, is pressed with such force against the band as to sever the end, or that portion which is now around the gavel, and firmly hold the indrawing end.

Before the cutting of the band, as above described, and after the end is released from the clamp, the tucker I is revolved while the binding mechanism is being elevated, as described, into about the position shown in Fig. 7. After the release of the end of the band from the clamp the released end, now held in the forked end of the tucker, comes in contact with the guide P, and is doubled back along the tucker I, in which position it is held during nearly a full half-revolution of the tucker, and until the latter is passing under the band on the gavel.

In Fig. 6 is shown the position of the gavel $R^2$ while the band is being tied. In Fig. 7 the bound gavel $R^2$ is slightly displaced to show more clearly the position of the tucker, its true position being that indicated by a dotted circle.

During the operation of tying the band, as hereinbefore explained, the grain at $R^1$ is constantly flowing in from the reaper-platform, and is being compacted under the band S, as shown at R, Figs. 6 and 7.

As soon as the band is tied, the direct movement of the shafts D' and $H^5$ follows, which movement withdraws the tucker from under the band, lowers the end of the shaft $H^5$, with its attached mechanism, out of the way of the head $E^2$, and turns the arms E one-fourth of a revolution. By this one-fourth revolution a new bundle, R, is gathered and carried to the binding mechanism at $R^2$, and the previously-bound gavel is elevated by the arms E and M to the position shown at $R^3$, Fig. 6. The reverse movements of the shafts $D^1$ $H^5$ now lift the end of the shaft $H^5$ and actuate the binding mechanism, as hereinbefore explained, and the crank-arms G and bars N' cause the arms N to swing out from the position shown at Fig. 6 to that shown in Fig. 7, which movement gently pushes the gavel $R^3$ off the arms M onto an inclined platform, T, down which it slides to the ground.

I do not confine myself to the use of four arms E, as it will be readily understood that any number may be employed. All that is necessary to adapt the machine to a different number than that described is to construct the clutches $G^1$ $g$ in such a manner as to give the proper revolution to the arm or arms, so as to hinge the head $E^2$ over and stop it in proper relative position to the binding mechanism on the shaft $H^5$.

Having described my invention, I claim and desire to secure by Letters Patent—

1. In a grain-binding machine, the combination, with the tying or tucking mechanism and the clamp and other devices for holding the band taut, of the head $E^2$ on the arm E, having slot $E^4$ and shoulders $E^5$ $E^6$, for the purposes specified.

2. The combination, with the arms E, of the fingers or lifting-arms M and arms N, supported and operated substantially as and for the purpose set forth.

3. The combination, with the tucker I, sleeve $i^2$, pin or stud $i^5$, bracket $i^6$, and pinion $i^1$, of the shaft $H^5$, pinion $i$, and bracket $j^3$, substantially as shown and described.

4. In a grain-binder, the combination, with the arms E and axis $D'$ and the tucker-revolving shafts $H^4$ $H^5$, of the crank-arm D, pitman $c'$, crank-wheel C, rack H, and pinion $H^1$, arranged and operating substantially as set forth.

5. The combination, with a series of arms, E, supported on a hub, $E^1$, having lateral extensions $e$, the ends or faces of which are provided with clutches $g$, and revolving on the shaft $D'$, of the clutches $G^1$ on the faces of the heads of the crank-arms G, and shaft $D'$, having a partial, direct, and reverse revolving movement, substantially as set forth.

6. The combination, with the arms E, curved at or near their outer ends, as described, of the lifting-arms M, pivoted to the inner ends of the arms E, and actuated by eccentrics F, arranged as and for the purpose set forth.

7. The combination, with the tucker-shaft $H^4$, provided with the pinion $H^1$, crank-wheel C, pitman $c'$, and crank D, of the rack H and rocking bearing $H^3$, substantially as and for the purpose set forth.

8. The curved tucker I, supported on an oscillating shaft, $H^5$, as described, and adapted to be revolved in a slot, $E^4$, in and over the top of the head $E^2$ on the arm E, for the purpose set forth.

9. The combination, with the bracket $j^3$, constructed with a lip or flange, $j^1$, and cam-sleeve $l$, supported on the axle $H^5$, as described, of the knife $j$, pad $j^2$, and arm $k$, having the jaw K, substantially as set forth.

10. The combination, with the arms E, supported on a hub, $E^1$, provided with clutches $g$, and arms N, pivoted to the standards $f^2$, of the actuating-bars $N'$, crank-arms G, provided with clutches $G^1$, shaft $D'$, crank D, and pitman C, substantially as and for the purpose set forth.

11. The combination, with the slotted platform $o$ and the tying and discharging mechanism, of the series of arms E, formed with elbows, as described, and having their ends pointed, and constructed with slots $E^4$ and shoulders $E^5$ $E^6$, and arranged on their central hub $E^1$ relatively to each other, substantially as set forth, and for the purposes specified.

In testimony that I claim the foregoing as my own I affix my signature in presence of two witnesses.

GEORGE H. HOWE.

Witnesses:
R. E. ABBOTT,
H. K. SAUDER.